United States Patent [19]

Bodolay et al.

[11] Patent Number: 5,776,045

[45] Date of Patent: Jul. 7, 1998

[54] MACHINE FOR ATTACHING A RECLOSABLE FASTENER TO A FLEXIBLE MATERIAL

[75] Inventors: William A. Bodolay; Michael J. Bodolay, both of Lakeland, Fla.

[73] Assignee: Lakeland Micro, Inc., Lakeland, Fla.

[21] Appl. No.: 554,434

[22] Filed: Nov. 6, 1995

[51] Int. Cl.[6] .................................................. B31B 1/90
[52] U.S. Cl. ................... 493/215; 53/133.4; 53/139.2; 53/51; 493/213; 493/344; 493/927; 156/519; 156/522; 156/583.1
[58] Field of Search ............................ 493/212, 213, 493/214, 215, 344, 927; 53/133.4, 139.2, 51; 156/516, 517, 519, 522, 583.1

[56] References Cited

U.S. PATENT DOCUMENTS

| | | | |
|---|---|---|---|
| 3,283,672 | 11/1966 | Mueller | 493/212 |
| 3,601,950 | 8/1971 | Drent et al. | 53/51 |
| 4,174,597 | 11/1979 | Mowli et al. | 493/215 |
| 4,400,230 | 8/1983 | Wyslotsky | 53/51 |
| 4,415,386 | 11/1983 | Ferrell et al. | 53/51 |
| 4,617,683 | 10/1986 | Christoff | 383/63 |
| 4,655,862 | 4/1987 | Christoff et al. | 156/66 |
| 4,765,118 | 8/1988 | Akutsu et al. | 493/212 |
| 4,844,759 | 7/1989 | Boeckmann | 156/66 |
| 4,878,987 | 11/1989 | Ven Erden | 156/519 |
| 4,909,017 | 3/1990 | McMahon et al. | 53/410 |
| 4,957,571 | 9/1990 | Cipolla | 156/66 |
| 4,974,395 | 12/1990 | McMahon | 53/139.2 |
| 4,979,933 | 12/1990 | Runge | 493/213 |
| 4,981,463 | 1/1991 | Susini et al. | 493/213 |
| 5,036,643 | 8/1991 | Bodolay | 53/128.1 |
| 5,085,031 | 2/1992 | McDonald | 53/412 |
| 5,167,608 | 12/1992 | Steffens, Jr. et al. | 53/133.4 |
| 5,254,073 | 10/1993 | Richison et al. | 493/213 |
| 5,383,989 | 1/1995 | McMahon | 493/213 |
| 5,400,569 | 3/1995 | Kanemitsu et al. | 493/213 |
| 5,529,659 | 6/1996 | Ellsworth et al. | 493/215 |

*Primary Examiner*—John Sipos
*Assistant Examiner*—John Paradiso
*Attorney, Agent, or Firm*—David W. Pettis, Jr.

[57] ABSTRACT

A machine for attaching a reclosable fastener to a web of flexible material primarily intended for use with a host packaging machine to form a reclosable container. The fastener attaching machine includes a motor that indexes the flexible material along a path through the fastener attaching machine. A cutting device disposed along the path forms a cut through a predetermined segment of the flexible material. A fastener supply means provides reclosable fasteners having distal ends and a predetermined length to an endless belt that conveys each fastener to a fusing means that respectively melts and cools the distal ends of each fastener. The endless belt then conveys the fused fastener to a sealing means that seals the reclosable fastener in overlying relation to the cut formed in the flexible web of material.

24 Claims, 6 Drawing Sheets

MACHINE FOR ATTACHING A RECLOSABLE FASTENER TO A FLEXIBLE MATERIAL

BACKGROUND OF THE INVENTION

1. Field of the Invention

The present invention relates generally to a machine for fixing a reclosable fastener to a flexible web of material. More particularly, the machine of this invention may be coupled with a conventional form, fill, seal and separate packaging machine in a manner that enables the packaging machine to produce high quality reclosable packages without interfering with the ordinary operation of the packaging machine.

2. Description of Prior Art

Ever since reclosable zipper-type plastic bags have been publicly available, they have increasingly become the preferred manner in which to store a variety of items. With the increasing consumer preference for reclosable zipper-type plastic bags, there have been continual efforts to develop packaging machines for producing such reclosable packages. This is especially true at the retail level for the sale of pre-packaged items such as, for example, food products.

As is well known in the field of flexible packaging, there presently exist numerous machines for automatically forming, filling and sealing materials in containers. With the consumer enthusiasm towards the reclosable zipper-type plastic bags, the packaging industry has sought to develop packaging machines for automatically forming, filling and sealing such reclosable containers. U.S. Pat. No. 5,036,643 discloses a form, fill, seal and separate packaging machine with a means to apply a zipper to a web of material. While this machine does provide a suitable means for forming, filling and separating packaging materials in reclosable containers, the means for applying the zipper-type lock to the flexible web is integral with the form, fill, seal and separate packaging machine. Those in the packaging industry that currently use conventional form, fill, seal and separate packaging machines are often unable to justify the cost of such machines that require replacing their existing machines.

It is, therefore, clear that there remains a great need in the art for a suitable machine for attaching a zipper material to a flexible material that is particularly adapted to cooperate with existing conventional packaging systems, dispensing with the requirement that existing packaging machines be replaced. In addition, such a machine should be capable of simple adjustment in order to accommodate the manufacture of reclosable packages of various sizes and weight content. Furthermore, it would be desirable for such a machine to operate in such a fashion that it will not significantly affect the ordinary operation of such conventional form, fill, seal and separate packaging machines to which it might be attached.

SUMMARY OF THE INVENTION

The present invention relates to a machine for attaching a reclosable zipper-type fastener to a flexible material primarily intended for use with a host form, fill, seal and separate packaging machine. More specifically, the machine of this invention may be adapted for use with virtually any conventional host form, fill, seal and separate packaging machine without the need for major modifications or adjustments to the existing packaging machine or its operation.

In the present invention, a flexible web of material is indexed by at least one controllable motor along a path through the machine of this invention whereupon a fused fastener is attached at predetermined positions. Before the fastener is attached to the flexible web, a cutting device, generally positioned along the path of the flexible web, makes at least one cut through a predetermined segment of the web each time the flexible web is indexed by the motor. In the preferred embodiment of the present invention, the cutting device preferably forms a removable portion of flexible material that provides convenient and tamper-evident access to the reclosable fastener of the finished container.

In another portion of the zipper attaching machine, there is means for supplying a predetermined length of the reclosable fastener. In the preferred embodiment, the reclosable fastener preferably comprises a pair of mating reclosable sealing strips having distal ends. One of the strips includes a male fastener part and the other strip includes a corresponding female fastener part.

Generally disposed downstream from this supply means, there is means for fusing the distal ends of this fastener. In order for the predetermined length of fastener to advance from the fastener supplying means to the fusing means, there are additional means for conveying each fastener from the supply means to the fusing means. The conveying means of the preferred embodiment includes a plurality of individual fastener receiving members that advance the predetermined length of fastener towards the fusing means as the flexible material indexes along its path. When the predetermined length of fastener arrives at the fusing means, the distal ends of the fastener are fused by an application of heat and pressure followed by cooling. In the preferred embodiment, the fused distal ends of the fastener preferably have sealed ends of substantially constant width and thickness with the remaining portion of the fastener.

Once the distal ends of a fastener have been fused, the conveying means advances the fused fastener towards the flexible material until it is aligned in overlying relation with the cut. Means for attaching the fused fastener to the flexible material is disposed downstream from the cutting device along the path of the flexible web. The attaching means seals along the perimeter of the fused fastener around the cut forming a flexible web having reclosable fasteners sealed at predetermined intervals thereto. In the preferred embodiment of the present invention, the flexible web having fasteners sealed thereto may conveniently be passed to a host machine to form reclosable containers.

The invention accordingly comprises the features of construction, combination of elements, and arrangement of parts which will be exemplified in the construction hereafter set forth, and the scope of the invention will be indicated in the appended claims.

BRIEF DESCRIPTION OF THE DRAWINGS

For a fuller understanding of the nature and objects of the invention, reference should be had to the following detailed description taken in connection with the accompanying drawings, in which.

3

Figure 3:
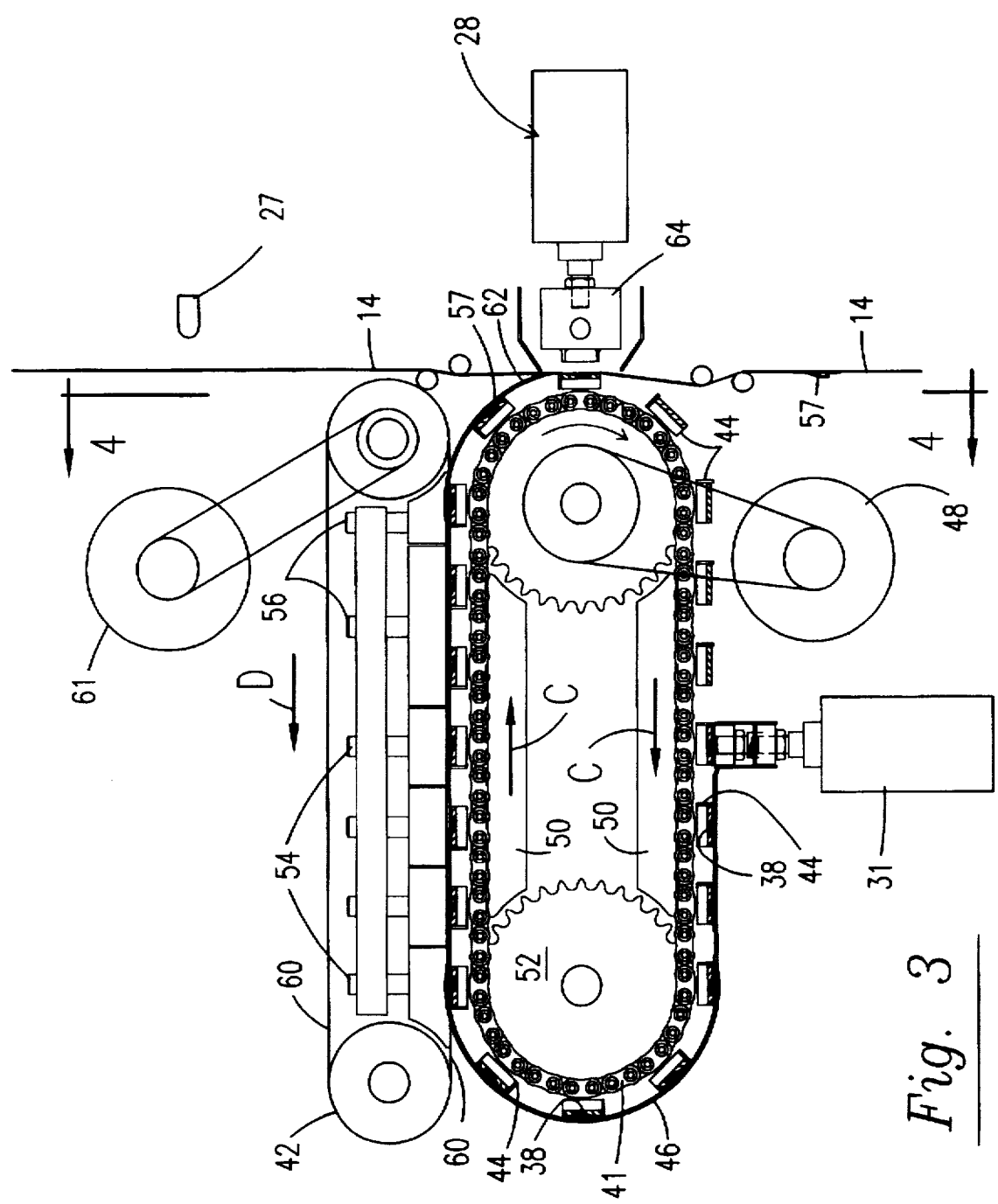
FIG. 3 is a front elevation illustrating the fastener placement device, the means for fusing the ends of the fastener and the means for attaching the fused fastener to the flexible material.
Figure 4:
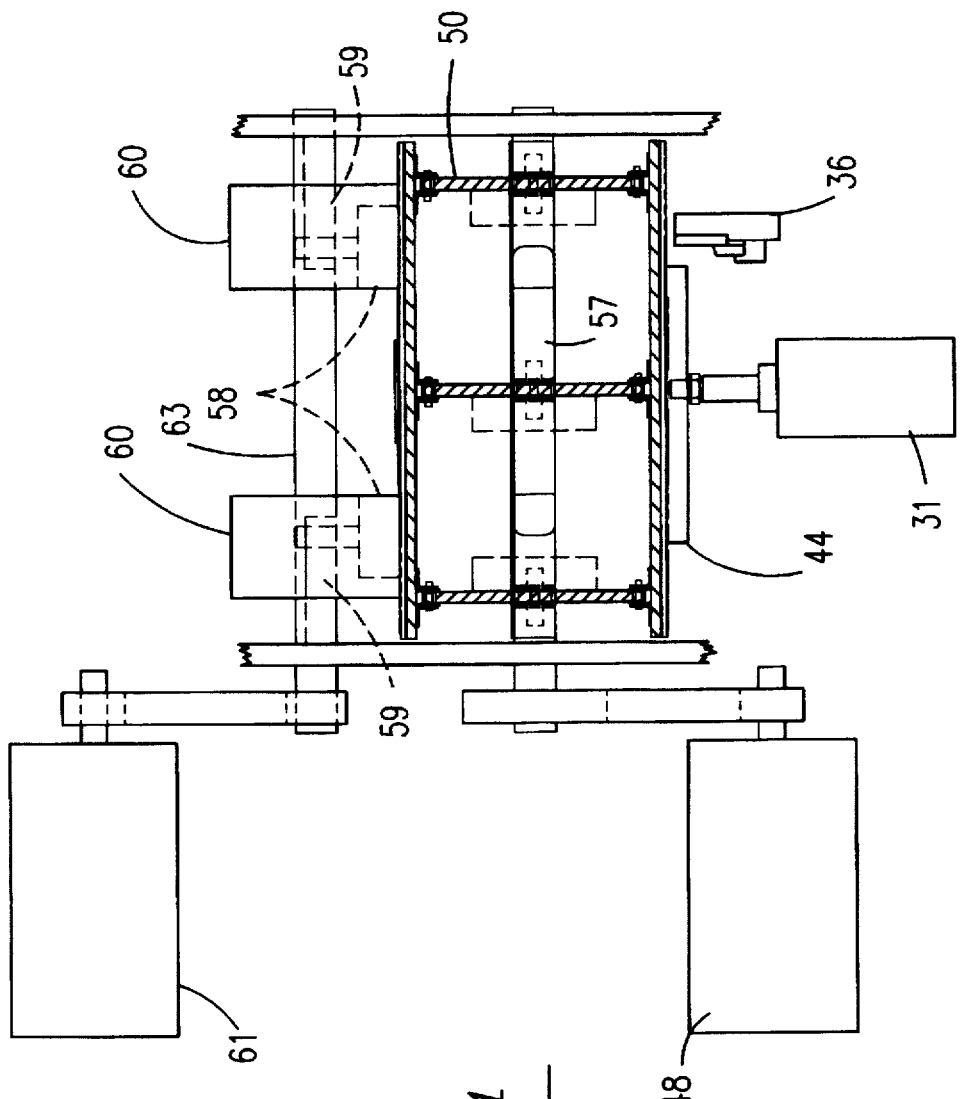

FIG. 4 is the right side elevation of the fastener attaching machine of FIG. 3 taken along line 4—4.

Figure 5:
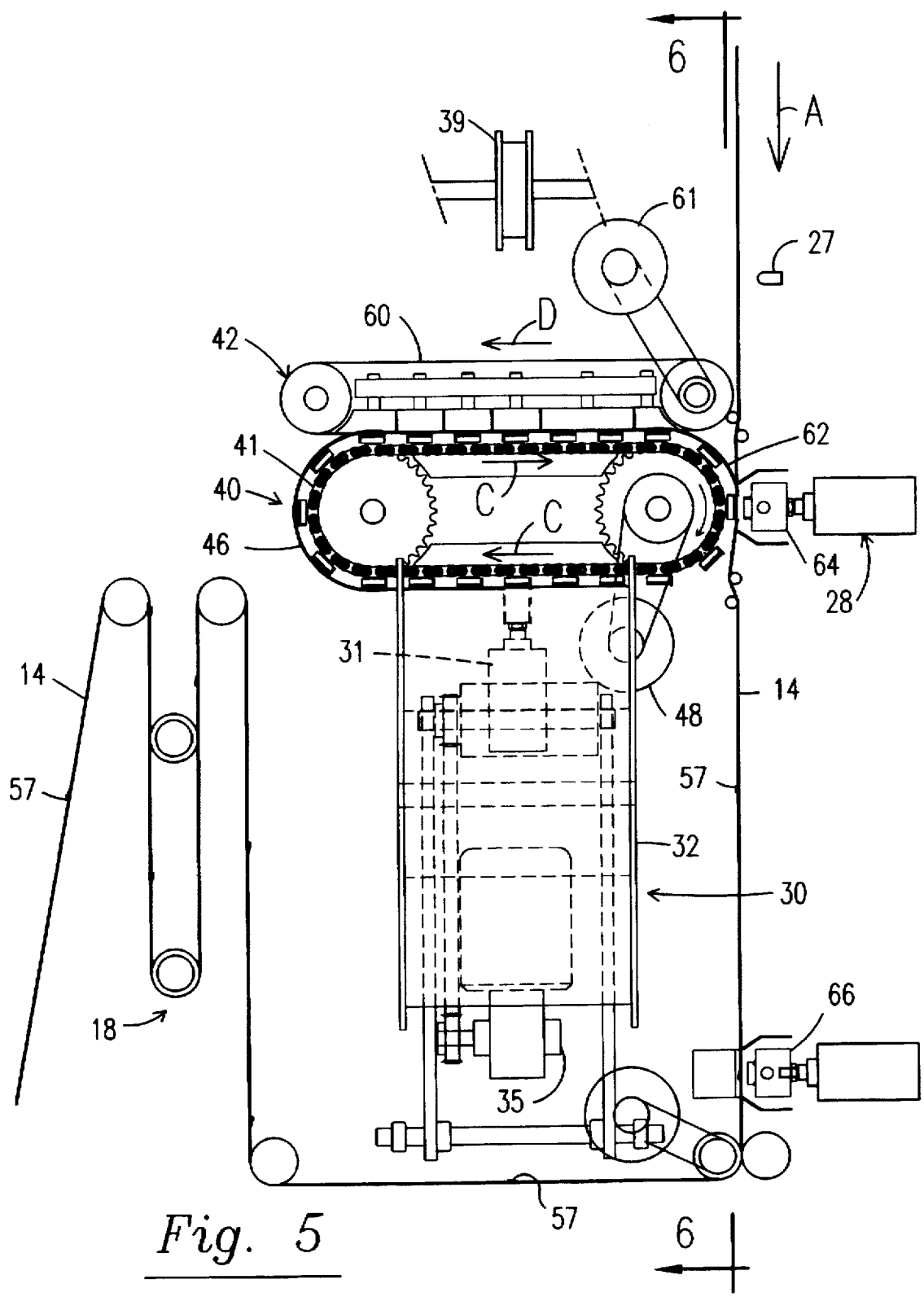

FIG. 5 is a detailed front elevation of a preferred embodiment of this fastener attaching machine showing the fastener supply means, the fusing means and the conveying means.

Figure 6:
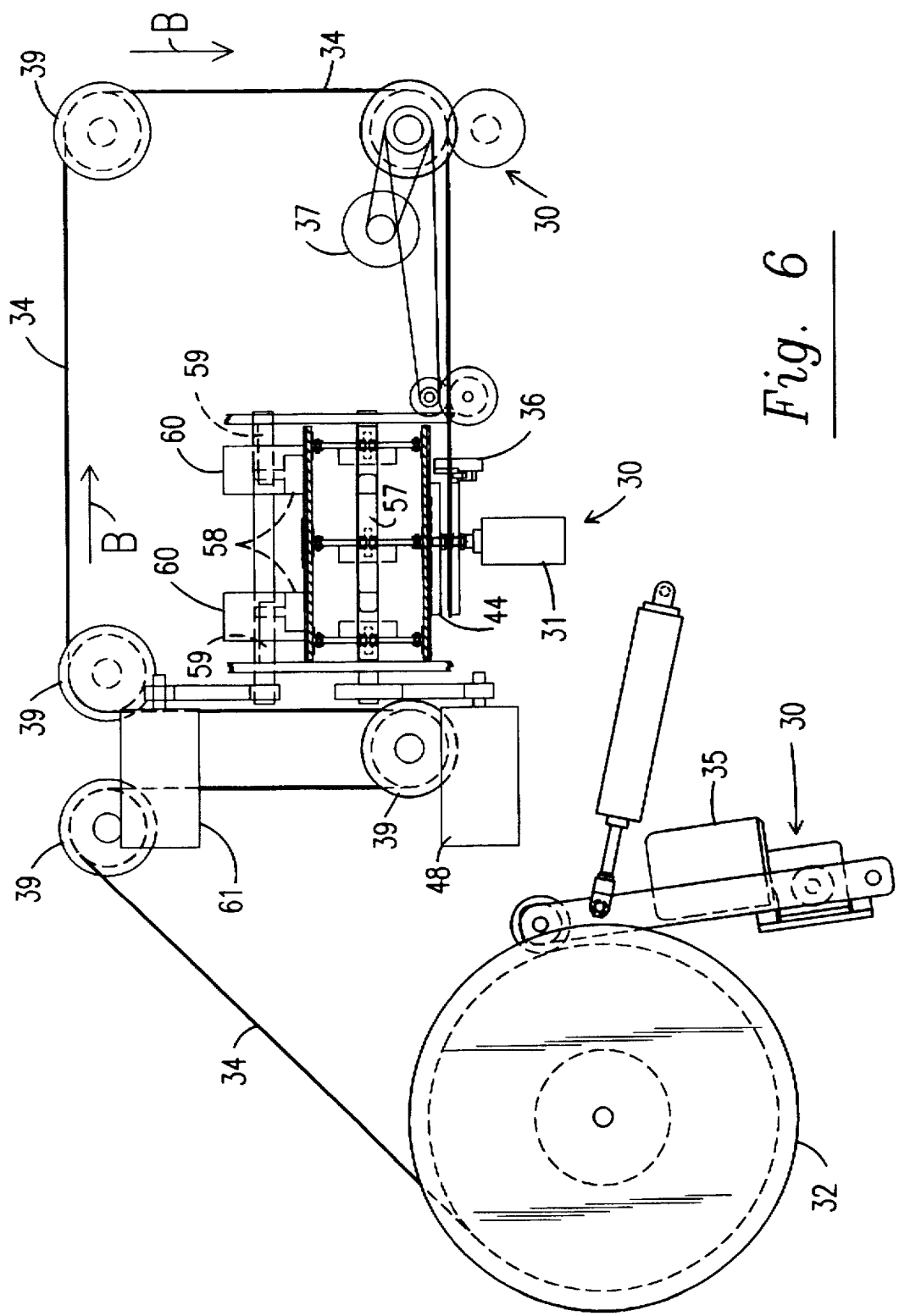

FIG. 6 is a right side elevation of the fastener attaching machine of FIG. 5 taken along line 6—6.

Similar reference characters refer to similar parts throughout the several views of the drawings.

DETAILED DESCRIPTION

Figure 1:
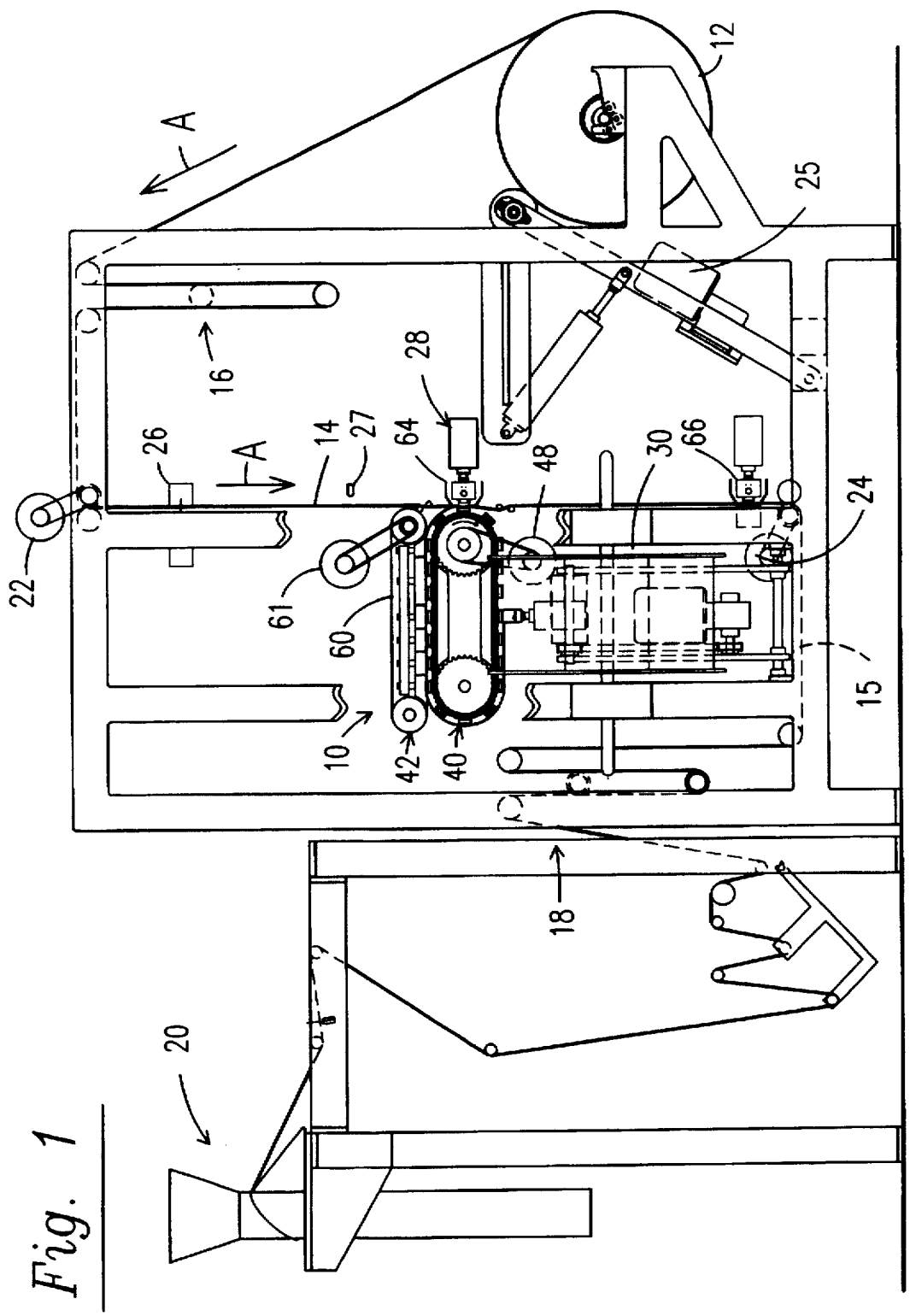
FIG. 1 is a front elevation of a preferred embodiment of the fastener attaching machine illustrating the flow path of the flexible material from a typical flexible material unwind through the fastener attaching machine and to a typical form fill, seal, and separate packaging machine.

The view of FIG. 1 illustrates the fastener attaching machine of this invention, generally indicated as 10, in a typical environment. The machine 10 is shown interposed between a flexible material supply 12 which provides the flexible material 14 through a series of rollers 16 to the fastener attaching machine 10 of the present invention. The fastener attaching machine generally sealingly attaches a reclosable fastener to predetermined segments of the flexible material 14 and passes flexible material 14 with the attached fasteners through a second series of rollers 18 to a conventional form, fill, seal and separate packaging machine 20. In particular, this fastener attaching machine 10 is primarily intended for, although not limited to, use with conventional vertical form, fill, seal and separate packaging machines.

Figure 2:
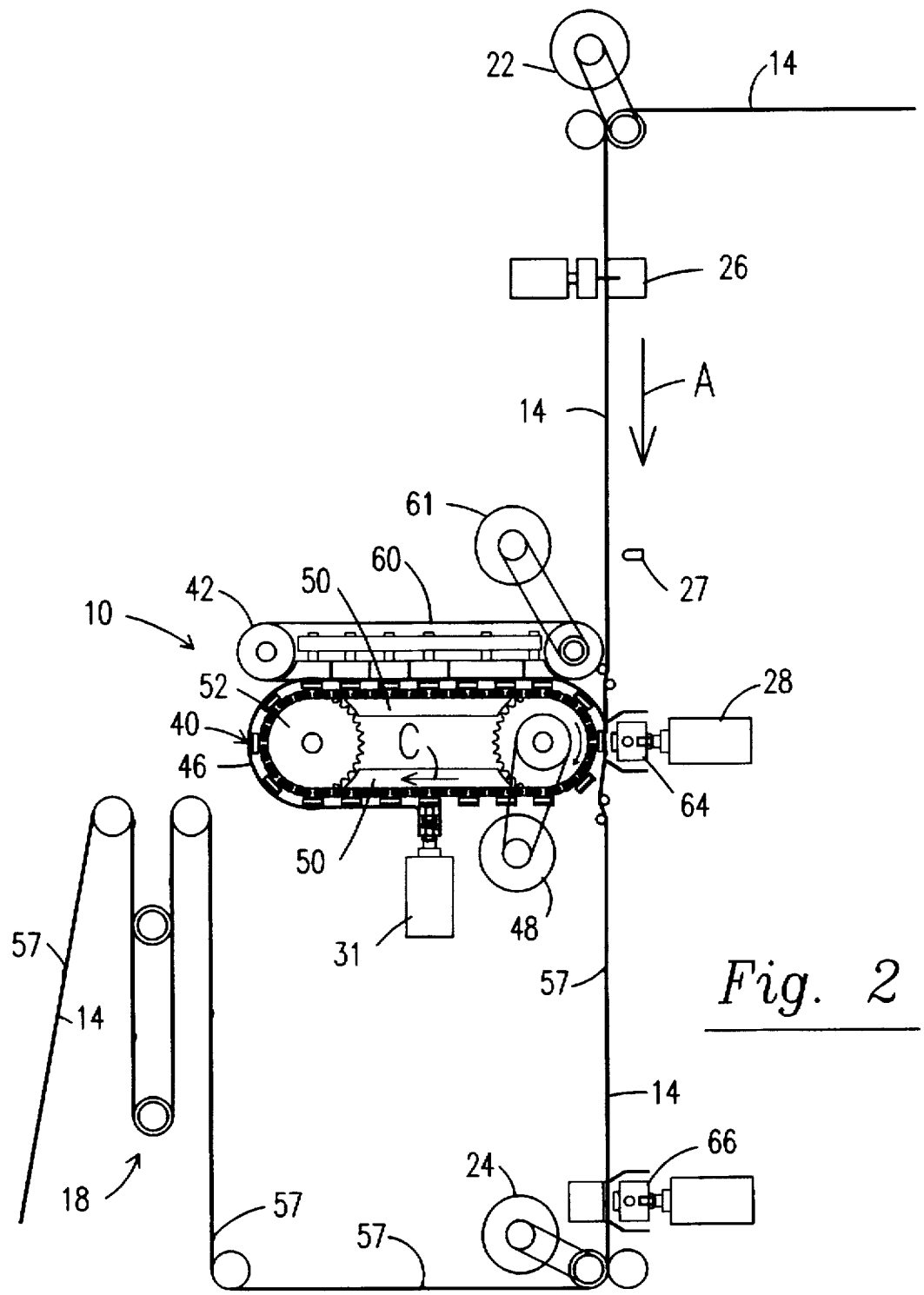
FIG. 2 is a front elevation of the fastener attaching machine of FIG. 1.

A preferred embodiment of the fastener attaching machine 10 of the present invention is illustrated in FIG. 2 as removed from its typical environment as shown in FIG. 1. For simplicity of illustration, the fastener supply means 30, other than fastener placement device 31, has also been removed from the view of FIG. 2. The flexible material 14, which may appropriately be a flexible web of material, generally follows the path as shown by arrow A in the views of FIGS. 1 and 2 from web supply 12. It should be noted that the series of rollers 16, shown in FIG. 1, preferably comprises conventional festoon rollers, often referred to as dancing bars, which are movable back and forth in a direction parallel to the path of travel of the flexible material 14. These rollers 16 serve to maintain tension in the flexible material 14 as well as designate when additional flexible material 14 should be indexed from the web supply 12.

A motor 22 indexes a predetermined length of flexible material at particular intervals from web supply 12 through machine 10. Preferably, motor 22 cooperates with a second motor 24 to maintain tension in the flexible material 14 as it indexes along path A through machine 10. Motor 25 unwinds the flexible material 14 from web supply 12. Preferably motors 22, 24, and 25, respectively, are high precision controllable motors such as, for example, programmable servo motors. These motors cooperatively and intermittently index the flexible material 14 in accordance with the requirements of the intended destination host machine 20, typically a vertical form, fill, seal and separate packaging machine, shown in FIG. 1. Such requirements may be communicated from host machine 20 to machine 10 via an electronic signal or other conventional feedback mechanisms known to those skilled in the art.

In the preferred embodiment of the present invention the web of flexible material 14 contains indicia, which may suitably be an ink mark, a hole or the like, at particular predetermined intervals along web 14. In addition, machine 10 preferably comprises an indicia detector 27 disposed along web path A for detecting the indicia and for providing cues to which the motors 22 and 24 are responsive. Thus, the motors 22 and 24 intermittently index the web in response to the requirements signal from the host machine 20 until each time the indicia detector 27 cues the motors to stop. The motors 22 and 24, respectively, may, also be programmed to index a predetermined length of web 14 in response to the host signal with the indicia detector 27 acting in conjunction with the rollers 16 and/or 18 to ensure that a proper amount of web 14 is supplied to the host machine 20.

Disposed downstream from motor 22 along path A is a cutting device 26 that forms at least one cut through a predetermined segment of the flexible web 14. Cutting device 26 preferably forms a plurality of cuts, such as perforations, through the flexible web 14 to provide a portion of flexible material that may be removed to access the subsequently to be attached fastener as described below. In addition, cutting device 26 may conveniently comprise a cutting die having at least two parallel pluralities of serrated edges that form a removable portion of flexible material of a substantially elliptical rectangle when it engages the flexible web 14.

Similarly to the motors 22 and 24, cutting device 26 is preferably responsive to the indicia detector 27 (see FIGS. 1,2 and 5) such that cutting device 26 forms the plurality of cuts in the flexible material 14 when the web 14 is not being indexed through the machine 10.

As the web of flexible material 14 is indexed along path A by motors 22 and 24, fastener attaching means 28 seals a fused reclosable fastener 57 to the flexible web of material 14 in overlying relation to the cuts formed by cutting device 26. However, in order to fully appreciate the attachment of the fused fastener 57 to the flexible web of material 14, we first turn to the fastener supply means, generally indicated as 30.

As shown in the combined views of FIGS. 5 and 6, the fastener supply means 30 generally includes the fastener supply reel 32, the fastener cutting device 36, the fastener placement device 31, and a pair of fastener supply drive motors 35 and 37, respectively. The right side view of FIG. 6 better illustrates how a continuous length of fastener 34 is fed along a path, as shown by arrow B in the view of FIG. 6, from fastener supply reel 32 through a series of rollers 39. The pair of motors 35 and 37 cooperate to maintain tension along the continuous length of fastener 34. As this length of fastener 34 moves along path B, a fastener cutting device 36 cuts fastener 34 to a predetermined length that is preferably longer than the length of the cut that was made through the segment of flexible material 14 by cutting device 26. This predetermined length of fastener is cut by cutting means 36 and is operatively engaged by fastener placement device 31 which passes the cut fastener 38 to conveyor means 40 (shown in FIG. 5). The fastener 34 preferably comprises a pair of mating reclosable sealing strips, commonly referred to as a zipper-type fastener, where one of the strips is a male fastener part and the other is a female fastener part. The male and female fastener part are preferably aligned in receiving relation, thereby forming the continuous length of a reclosable fastener 34.

In the preferred embodiment of the present invention, cutting means 36 and fastener placement device 31 are easily adjusted to cut and provide to conveyor means 40 a predetermined desired length of cut fastener 38. It is advantageous for fastener supply means 30 to provide the fastener in a substantially flat and transverse alignment to the path that conveyor means 40 travels.

Conveyor means 40 comprises an endless belt, such as an endless roller chain 41, that generally passes the cut fastener 38 from the fastener supply means 30 along a path, indicated by arrow C in the views of FIGS. 2, 3 and 5, to a means 42 for fusing the distal ends of the cut fastener 38. In the preferred embodiment, conveyor means 40 comprises a plurality of fastener receiving members 44 mounted on the endless roller chain 41, such that each member may receive a cut fastener 38. The endless roller chain 41 and, consequently, the fastener receiving members 44 are intermittently indexed by conveyor motor 48 along path C a predetermined distance in synchronization with the movement of the web of flexible material 14.

It is also preferred that as the cut fastener 38 is received in each fastener receiving member 44, that means are provided for holding the cut fastener 38 in the fastener receiving member 44. This holding means may conveniently take the form of a guide, a rail, a movable belt or the like and is generally indicated as 46 in the views of FIGS. 2, 3 and 5.

As with each part of the fastener attaching machine 10, the conveyor means should cooperate with the other component parts in order to achieve efficiently the desired results. Therefore, the movement of the fastener receiving members 44 along path C is controlled by motor 48 as is best shown in FIG. 3. The conveyor motor 48 preferably indexes each fastener receiving member 44 along path C at predetermined and substantially precise increments. It should also be noted that the fastener receiving members 44 should be substantially rigidly supported along path C as indexed. Such support is appropriately illustrated in the view of FIG. 3 as support beams 50 and the sprockets 52 upon which the conveyor means rotates.

As motor 48 indexes the fastener receiving members 44 along path C, the cut fasteners 38 pass adjacent to the fusing means, generally indicated as 42. As shown in FIG. 3, fusing means 42 preferably comprises a heating station 54 and a cooling station 56 that operate to respectively melt and cool the distal end portions of cut fastener 38. As shown in the right side elevation of FIG. 3, illustrated in FIG. 4, both the heating and cooling station 54 and 56, respectively, comprise at least one pair of plunger-like members 58, each of said pair being heating or cooling surfaces, respectively. These plunger-like members 58, which are preferably a plurality of such members, move substantially transverse to the fastener receiving members 44 such that the heating surfaces and the cooling surfaces may cooperate to fuse the distal ends of the cut fasteners 38. In addition, as shown in FIG. 4 the heating and cooling members preferably may be horizontally adjusted along support arm 59 for fusing the distal ends of fasteners having various lengths.

In a preferred embodiment, fusing means 42 also includes a movable belt 60, which may suitably be a conventional glass cloth belt, having an outer surface that is coated with an insulating material that surrounds the heating and cooling stations 54 and 56, respectively. The belt 60 preferably moves in a path as shown by arrow D in the views of FIGS. 3 and 5. As shown in FIG. 4, the movable belt 60 preferably includes a pair of such belts that, similar to the pairs of heating and cooling members, 54 and 56, respectively, are adjustable in a horizontal direction along support bar 59 to accommodate various lengths of cut fasteners 38. As the fastener receiving members 44 index the cut fastener 38 along path C, the plunger-like member of heating station 54 move downwardly to apply heat and pressure to the belt 60 such that the belt releasingly engages the distal ends of the fastener 38, thereby melting the distal ends. Simultaneously, and downstream from the heating station 54, the cooling surface of the cooling station 56 moves downwardly to apply cooling and pressure to the belt 60, accordingly cooling the previously melted distal ends. Preferably, heating station 54 and cooling station 56, through their respective applications of heat, pressure and cooling, form a reclosable fastener having fused distal ends of substantially uniform width and thickness throughout the fastener.

Once the distal ends of the fastener 38 have been fused and cooled by the heating and cooling stations 54 and 56, respectively, fastener receiving members 44 convey the fused fasteners 57 to the fastener attaching means 28 such that the fused fastener 57 is positioned in overlying relation to the cut in the flexible web of material 14. This accurate positioning of fastener 38 results from the cooperation by the motors 22 and 24 indexing the web 14 and the incremental indexing of the fastener receiving members 44 by conveyor motor 48.

It should be noted that similar to the fastener holding means 46, an additional fused fastener holding means 62 is positioned between fusing means 42 and the fastener attaching means 28. This maintains the fused fasteners 57 in an appropriate position in the fastener receiving members 44 as each is conveyed to the fastener attaching means 28.

The fastener attaching means 28 sealingly attaches both the male and female parts of the fused fastener 57 to a common surface of the flexible web 14 in overlying relation to the cut by sealing means 64 melting the perimeter portion of the fused fastener 57 to the web 14. Sealing means 64 may comprise, for example, a conventional heated iron having suitable thermal properties to rapidly effect the heat seal. In the preferred embodiment of this invention as illustrated in FIGS. 1, 2, and 5, a second sealing means 66 is disposed downstream from the first sealing means 64 to effect additional sealing along the perimeter of the fused fastener 57 to the web 14. By utilizing two sealing means to effect the seal rather than a single sealing means, the operating speed and overall efficiency of fastener attaching machine 10 may significantly be improved. Generally, this is because the seal around the fastener 57 is accomplished in a two step process rather than in a single step. Each sealing means 64 and 66 may form a partial seal such that the consecutive sealing along the perimeter of the fused fastener 57 insures a high quality hermetic seal to the flexible web 14 around the plurality of cuts. In order to ensure proper positioning of each subsequent seal, sealing means 66 is preferably disposed downstream from sealing means 64 at a distance substantially equal to an integral multiple of the length that the web 14 is indexed by motors 22 and 24. While the preferred embodiment contains two suitably placed sealing means, it will be understood and appreciated by those skilled in the art, that in accordance with this invention additional sealing means may be disposed along the path A of the flexible material 14.

Once the fastener 57 has been appropriately sealed to a common surface of the flexible web of material 14, the web 14 is passed to an appropriate host machine such as the vertical form, fill, seal, and separate packaging machine 20 of FIG. 1. The flexible material having the fused fasteners sealed thereto may be further processed by the host machine to form a complete reclosable container. Because of the general interdependence between the component parts of the machine 10 and host machine 20, it will be appreciated that the machine of the present invention provides to host machine 20 the flexible web of material in a non-intrusive manner. More specifically, the interposition of the machine 10 between the web supply 12 and host machine 20 results in little or no interference with the normal operation of host machine 20. Thus, it will be appreciated that this invention provides an improved machine for attaching reclosable fasteners to a flexible web of material that is easily adaptable to provide a web of material having reclosable fasteners to conventional form, fill, seal and separate packaging machines, thereby resulting in an overall improved packaging system capable of producing high quality reclosable packages.

It is, of course, to be understood that the preferred embodiment described herein operates intermittently. That is to say that advancement of the flexible material 14 and of the fastener 34 is intermittent, as opposed to continuous.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A machine for attaching a reclosable zipper-type fastener to a flexible material primarily intended for use with a host form, fill, seal and separate packaging machine to form a reclosable container, said machine comprising:

a means for supplying a flexible material to said machine;

at least one motor for indexing a predetermined length of flexible material along a path through said machine;

a cutting device that forms at least one cut through a predetermined segment of said flexible material, said device being disposed along said path of said flexible material;

means for supplying a predetermined length of a reclosable fastener having a perimeter and fastener distal ends, said fastener comprising a pair of mating reclosable sealing strips, one of said strips comprising a male fastener part and the other of said strips comprising a female fastener part;

means for fusing said distal ends of said fastener disposed downstream from said supplying means;

means for conveying said fastener from said supplying means to said fusing means such that each said fastener passes adjacent to said fusing means; and means for attaching said fused fastener to said flexible material in overlying relation to said cut by sealing along said perimeter of said fused fastener around said cut.

2. A machine as in claim 1 wherein said motor comprises a first controllable motor that pushes said flexible material from a source of said flexible material and a second controllable motor disposed downstream from said first motor that pulls said flexible material from said first motor such that said first and said second motor generally maintain tension in said flexible material between said first and said second motor.

3. A machine as in claim 2 wherein said flexible material includes a surface having an indicia disposed along said surface at predetermined intervals.

4. A machine as in claim 3 further comprising an indicia detector that upon detection of said indicia said detector cues said first and second motors to stop indexing said web of flexible material.

5. A machine as in claim 1 wherein said cut further comprises a plurality of cuts.

6. A machine as in claim 5 wherein said plurality of cuts form a removable portion of said flexible material.

7. A machine as in claim 6 wherein said attaching means sealingly attaches said fastener to said flexible material along said perimeter of said fused fastener around said removable portion of said flexible material.

8. A machine as in claim 7 wherein said attaching means further comprises a first means for sealing along said perimeter of said fastener around said removable portion of said flexible material and a second means for sealing along said perimeter of said fastener around said removable portion of said flexible material, whereby said first and second sealing means cooperate to seal along said perimeter of said fused fastener around said removable portion.

9. A machine as in claim 8 wherein said second sealing means is spaced downstream from said first sealing means along said path of said flexible material a distance substantially equal to an integral multiple of said predetermined length of said flexible material.

10. A machine as in claim 1 wherein said conveying means further comprises a controllable, movable endless belt for receiving said fasteners from said supplying means.

11. A machine as in claim 10 wherein said conveying means further comprises a plurality of fastener receiving members mounted on said endless belt, each of said fastener receiving members receiving a predetermined length of said fastener from said supplying means.

12. A machine as claimed in claim 11 wherein said conveying means further comprises means for holding said predetermined length of fastener in said fastener receiving members.

13. A machine as in claim 1 wherein said fusing means further comprises a heating station that applies heat and pressure to said distal ends of said fastener to melt said distal ends of said fastener.

14. A machine as claimed in claim 13 wherein said heating station comprises at least one heating surface movably mounted in said fusing means for applying heat and pressure to said distal ends of said fastener.

15. A machine as in claim 14 wherein said heating surface comprises a plurality of heating surfaces movably mounted to said fusing means, each said heating surface applying heat and pressure to at least one of said distal ends of said fastener.

16. A machine as in claim 15 wherein said fusing means further comprises a movable belt having a surface that includes an insulating material, said movable belt overlaying said plurality of heating surfaces of said heating station such that each of said heating surfaces of said heating station may move to releasingly engage said belt to apply heat and pressure to melt said distal ends of said fastener.

17. A machine as in claim 13 wherein said fusing means further comprises a cooling station disposed downstream from said heating station for cooling said melted distal ends of said fastener.

18. A machine as in claim 17 wherein said cooling station comprises a plurality of cooling surfaces movably mounted to said fusing means, each of said cooling surfaces applying cooling and pressure to said melted distal ends of said fastener.

19. A machine as in claim 18 wherein said fusing means further comprises a movable belt having an outer surface comprising an insulating material, said movable belt overlies said heating surfaces and said cooling surfaces such that each of said heating surfaces may releasingly engage said movable belt to apply heat and pressure to melt said distal ends, and each of said cooling surfaces may releasingly engage said belt to cool said melted distal ends of said fastener, whereby said distal ends are fused.

20. A machine as in claim 19 wherein said conveying means positions said fused fastener in overlying relation to said cut.

21. A machine as in claim 1 wherein said supplying means supplies to said conveying means said pair of sealing strips having a length that is longer than said cut through said flexible material.

22. A machine as in claim 21 wherein said supplying means further comprises means to cut said pair of sealing strips to a predetermined length that is longer than the length of said cut through said predetermined segment of said flexible material.

23. A machine as in claim 22 wherein said fusing means fuses corresponding said distal ends of said pair sealing strips with said male part and said female part aligned in receiving relation to form a reclosable fastener.

24. A machine for attaching a reclosable zipper-type fastener to a flexible material having a surface including an indicia disposed along at predetermined intervals, said machine primarily intended for use with a host apparatus that supplies a signal to said machine, said machine comprising:

- means for supplying a flexible material to said machine;
- at least one motor for indexing a predetermined length of flexible material along a path through said machine with said motor indexing said flexible material in response to said signal from the host machine;
- an indicia detector disposed along said path of said flexible material that upon detection of said indicia provides a cue;
- a cutting device for forming at least one cut through a predetermined segment of said flexible material in response to said indicia detector cue, said cut forming means disposed along said path of said flexible material;
- means for supplying a predetermined length of a reclosable fastener having a perimeter and distal ends;
- means for fusing said distal ends of said predetermined length of said fastener disposed downstream from said supplying means comprising a cooling station and a heating station that respectively heat and cool said distal ends of said fastener in response to said indicia detector cue;
- a controllable, endless belt that receives said fasteners from said supplying means and conveys said fasteners to said fusing means such that said fastener passes adjacent to said fusing means, said controllable endless belt conveying said fasteners in response to said host signal; and
- means for sealing said fused fastener to said flexible material in overlying relation to said cut along said perimeter of said fused fastener around said cut in response to said indicia detector cue.

* * * * *